United States Patent Office 2,875,180
Patented Feb. 24, 1959

2,875,180

SYNTHETIC RESINS DERIVED FROM HYDROXY-METHYLFURFURAL AND KETONES

Francis H. Snyder, Newtown, Conn., assignor to Dendrol, Inc., Memphis, Tenn., a corporation of Delaware No Drawing. Application August 3, 1953
Serial No. 372,173

12 Claims. (Cl. 260—64)

This invention relates to novel synthetic resins derived from hydroxymethylfurfural and ketones and to processes of preparing same.

The novel synthetic resins of the invention are prepared by reacting hydroxymethylfurfural with a ketone in the presence of an alkali. Any ketone having at least two alpha hydrogen atoms, such as acetone, methyl ethyl ketone, methyl decyl ketone and the like, may be used. The amount of ketone employed may vary from about 1 to about 2 mols of ketone per mol of hydroxymethylfurfural.

In carrying out the process, the ketone, preferably in substantial excess of the amount required for the reaction, is mixed with the hydroxymethylfurfural and sufficient alkali is added to the mixture to give a pH from about 9 to 13 and preferably from about 10 to about 11.5. The resulting mixture is then heated to reflux temperature and is refluxed with agitation for a period ranging from about 10 minutes to several hours. At the end of the reflux, sufficient acid is added to adjust the pH to 7.0 or below following which the resin separates as a dark viscous oil. The separated resin is heavier than water and may be withdrawn by gravity, washed with several volumes of hot water accompanied by agitation, and then cooled in a Votator or similar surface cooler.

Any alkali capable of producing the required pH may be used. Ammonia is preferred since it may be used in considerable excess without rendering the reaction mass too alkaline. The hydroxides of sodium, potassium, barium, calcium and magnesium have been used with success.

The reaction between the hydroxymethylfurfural and the ketone can be carried out with hydroxymethylfurfural in a pure or substantially pure form, or alternatively, can be carried out with crude solutions containing hydroxymethylfurfural such as, for example, the crude hydrolysate liquor obtained in the acid hydrolysis of hexoses or materials containing or yielding hexoses. In such process, hexose or a material containing or yielding hexose is subjected to high pressure, high temperature hydrolysis with steam, in the presence of an acid, under conditions of temperature, pressure, time and pH, controlled so as to obtain a liquid condensation product in the form of a crude hydrolysate liquor, the major component of which is hydroxymethylfurfural. Depending upon the particular materials used, such hydrolysate liquor may also contain small quantities of sugars, formic acid, acetic acid, levulinic acid, and so forth.

Such crude hydrolysate liquor, in the raw state, has a pH below about 3.0 and usually between about 2.5 and 2.9 and contains hydroxymethylfurfural in a concentration ranging from about 2 to 10 percent, which may be increased, if desired, by evaporation of a portion of the water. This material is well adapted for use in the process of the present invention and, in fact, constitutes a preferred source of hydroxymethylfurfural, since it can be produced rather economically, and used in the crude form obtained without further purification or other treatment. It can be used in dilute form, as obtained from the reactor, or alternatively may be concentrated by evaporation of a portion of the water to a soluble solids content of from about 25 to about 60 percent, and a hydroxymethylfurfural concentration of from about 40 to 50 percent.

The following examples will serve to illustrate the invention. In these examples, the hydroxymethylfurfural utilized was contained in the crude hydrolysate liquor obtained by the steam hydrolysis of acid impregnated oak wood chips at a pressure of approximately 1000 pounds per square inch gauge for about 90 seconds. In some cases, the crude hydrolysate liquor was used without further treatment or concentration and in other cases the liquor was concentrated to varying degrees as shown by the percentage of soluble solids.

*Example 1*

250 pounds of hydroxymethylfurfural in the form of a 40 to 50 percent solution was charged into a heated, agitated vessel equipped with a reflux condensor. 100 pounds of methyl ethyl ketone was then run in followed by the addition of about 25 pounds of 26 percent aqueous ammonia to raise the pH to about 11. The addition of the ammonia caused the temperature to rise rapidly to the boiling point which was about 80° C. Reflux conditions were maintained for from 40 to 80 minutes whereupon sufficient 10 percent sulphuric acid was added to adjust the pH to approximately 7 or a little lower. Excess methyl ethyl ketone was removed by tapping the reflux line after which agitation was stopped and a somewhat viscous resin separated out as a dark oil, heavier than water. This was withdrawn by gravity into an open mixing tank where it was agitated with 2 or 3 volumes of hot water. The settled resin was then drawn off into cooling pans and cooled. The finished product was a dark brown to black liquid of considerable viscosity.

*Example 2*

Fresh crude hydrolysate liquor was concentraded to about 50 percent solids and the pH adjusted to 11 with sodium hydroxide. This solution was then refluxed for one hour with an excess of acetone. Upon acidification to a pH below 7 a dark oily viscous resin separated out. This resin was generally similar in all respects to the resin obtained in Example 1.

*Example 3*

Example 2 was repeated except that the reaction was conducted at a pressure between 10 and 50 pounds per square inch gauge in order to increase the reflux temperature. The resin obtained was similar in all respects to that obtained in Example 2 but was in somewhat higher yield because of the increased reflux temperature.

*Example 4*

To 500 mls. of concentrated hydrolysate liquor containing 61 percent solids was added 100 mls. of 26 percent ammonium hydroxide and 165 mls. of methyl ethyl ketone (132 grams). The mixture was refluxed for one hour following which it was acidified with 100 mls. of phosphoric acid (85 percent). Excess methyl ethyl ketone in the amount of about 100 mls. was then distilled off and recovered. A bright, oily resin separated out on acidification and following distillation of the methyl ethyl ketone. The resin layer was washed twice with hot water and then cooled. The resin obtained was generally similar to that obtained in the preceding examples.

*Example 5*

Fresh crude hydrolysate liquor was concentrated to 50 percent solids under vacuum. Ammonium hydroxide was added to about 170 mls. of the concentrated liquor until an excess was apparent. The solution became thick and solids precipitated out. More ammonium hydroxide was added to dissolve this precipitate and raise the pH to 11. 99.5 mls. of methyl ethyl ketone was then added and the mixture refluxed for 1½ hours. The mixture was then acidified to pH 3.5 with hydrochloric acid and excess methyl ethyl ketone in the amount of 95 mls. was distilled off and collected. The supernatant liquor was poured off and the resin washed twice with boiling water. The entrained water was removed by heating on a steam bath. 69 grams of an oily resin was recovered.

The finished product is a dark brown to black liquid of considerable viscosity. It is soluble in alcohol, ketones, alkalis, phenols and, in fact, in most polar solvents and is miscible in all proportions with most of the materials in which it is at all soluble. This resin is a typical thermo-setting material which cures in about 40 seconds at 330° C. and the curing time may be reduced by the addition of hexamethylenetetramine, acids or bases. The cured material is highly resistant to solvents, oils, acids, bases, water and so forth. It is used in exactly the same way as phenolic resins in molding compounds, rubber, adhesives, binders, laminates, hardboards, and so forth. It is odorless, tasteless and non-toxic. It adds flow, alkali, and water resistance and strength to various molding materials such as standard phenolics. It is an excellent binder for glass-fiber insulation, for sand molds and for wood-particle boards and moldings.

The term "hydrolysate liquor," as used in the claims, refers to the liquid product, including soluble dissolved solids, obtained in the manner hereinabove described, and either in the raw state, as obtained, or in a more concentrated state brought about by evaporation of a portion or all of the water.

The examples herein given are for the purpose of illustration only and are not to be construed as limiting the invention, the scope of which is as defined in the following claims.

I claim:

1. The process of preparing a synthetic resin which comprises reacting hydroxymethylfurfural with a ketone having at least two alpha hydrogen atoms at a pH between about 9 and 13.

2. The process of preparing a synthetic resin which comprises heating a mixture of hydroxymethylfurfural, a ketone having at least two alpha hydrogen atoms, and sufficient alkali to give a pH between about 9 and 13, to reflux temperature, refluxing the mixture for a period of time from about 10 minutes to several hours, acidifying the mixture to a pH below about 7, removing the excess ketone, and recovering the resinous material which separated out.

3. The process of preparing a synthetic resin which comprises reacting a ketone having at least two alpha hydrogen atoms with hydrolysate liquor obtained by the steam hydrolysis of acid impregnated hexose containing or yielding material at elevated temperatures and pressures and under conditions of time and pH such that the major component of the liquor, aside from water, is hydroxymethylfurfural, at a pH between about 9 and 13 for a period of time from about 10 minutes to several hours.

4. The process as set forth in claim 3 wherein the ketone is acetone.

5. The process as set forth in claim 3 wherein the ketone is methyl ethyl ketone.

6. The process of preparing a synthetic resin which comprises concentrating fresh crude hydrolysate liquor obtained by the steam hydrolysis of acid impregnated hexose containing or yielding material at elevated temperatures and pressures and under conditions of time and pH such that the major component of the liquor, aside from water, is hydroxymethylfurfural, to a solids content of between about 25 and 60 percent, and reacting this concentrated liquor with a ketone having at least two alpha hydrogen atoms at a pH between about 9 and 13 for a period of time such that a dark viscous resinous material separates out upon acidification to a pH below about 7 and removal of excess ketone.

7. The process of preparing a synthetic resin which comprises concentrating fresh crude hydrolysate liquor obtained by the steam hydrolysis of acid impregnated hexose containing or yielding material at elevated temperatures and pressures and under conditions of time and pH such that the major component of the liquor, aside from water, is hydroxymethylfurfural, to a solids content of between about 25 and 60 percent, reacting the concentrated liquor with a ketone having at least two alpha hydrogen atoms, in the presence of sufficient alkali to give a pH between about 9 and 13, continuing the reaction for a period of time from about 10 minutes to several hours, acidifying the mixture to a pH below about 7, removing excess ketone, and recovering the dark oily resinous material which separates out.

8. The process of preparing a synthetic resin which comprises concentrating fresh crude hydrolysate liquor obtained by the steam hydrolysis of acid impregnated hexose containing or yielding material at elevated temperatures and pressures and under conditions of time and pH such that the major component of the liquor, aside from water, is hydroxymethylfurfural, to a solids content of between about 25 and 60 percent, adjusting the pH of the concentrated liquor to between about 9 and 13 by the addition of an alkaline material, refluxing the mixture with an excess of a ketone having at least two alpha hydrogen atoms for a period of time from about 10 minutes to several hours, acidifying the mixture to a pH below about 7 by the addition of a mineral acid, and recovering the dark oily resin which separates out.

9. The process of preparing a synthetic resin which comprises concentrating fresh crude hydrolysate liquor obtained by the steam hydrolysis of acid impregnated hexose containing or yielding material at elevated temperatures and pressures and under conditions of time and pH such that the major component of the liquor, aside from water, is hydroxymethylfurfural, to a solids content of between about 25 and 60 percent, adjusting the pH of the concentrated liquor to between about 9 and 13 by the addition of an alkaline material, reacting the concentrated liquor with an excess of a ketone having at least two alpha hydrogen atoms in a ratio from about 1 to about 2 mols of ketone to each mol of hydroxymethylfurfural contained in the concentrated liquor, continuing the reaction for a period of time from about 10 minutes to several hours, acidifying the mixture to a pH below about 7, and recovering the dark oily resin which separates out.

10. A synthetic resin comprising the reaction condensation product obtained by reacting hydroxymethylfurfural with a ketone having at least two alpha hydrogen atoms at a pH between about 9 and about 13 followed by acidifying the mixture to a pH below about 7.

11. A synthetic resin comprising the product of condensation under alkaline conditions of hydroxymethylfurfural with a ketone having at least two alpha hydrogen atoms.

12. A synthetic resin comprising the product of condensation under alkaline conditions of a ketone having at least two alpha hydrogen atoms with hydrolysate liquor obtained by the steam hydrolysis of acid impregnated hexose containing or yielding material at elevated temperatures and pressures and under conditions of time and pH such that the major component of the liquor, aside from water, is hydroxymethylfurfural.

References Cited in the file of this patent

UNITED STATES PATENTS

| | | |
|---|---|---|
| 1,584,144 | Richardson | May 11, 1926 |
| 2,461,510 | Harvey | Feb. 15, 1949 |
| 2,498,918 | Haworth et al. | Feb. 28, 1950 |
| 2,776,948 | Snyder | Jan. 8, 1957 |

FOREIGN PATENTS

| | | |
|---|---|---|
| 583,021 | Great Britain | Dec. 5, 1946 |